(12) United States Patent
Davidson

(10) Patent No.: US 7,099,309 B2
(45) Date of Patent: Aug. 29, 2006

(54) USING A HANDHELD COMMUNICATION DEVICE WITH A HOT SPOT NETWORK

(75) Inventor: Gary Davidson, DeSoto, TX (US)

(73) Assignee: Air-Bank LLC, DeSoto, TX (US)

( * ) Notice: Subject to any disclaimer, the term of this patent is extended or adjusted under 35 U.S.C. 154(b) by 0 days.

(21) Appl. No.: 10/961,923

(22) Filed: Oct. 8, 2004

(65) Prior Publication Data

US 2005/0117566 A1    Jun. 2, 2005

Related U.S. Application Data

(60) Provisional application No. 60/510,697, filed on Oct. 10, 2003.

(51) Int. Cl.
 *H04J 3/16* (2006.01)
(52) U.S. Cl. ..................................................... 370/352
(58) Field of Classification Search ............. 370/329, 370/318, 351, 352, 465, 466, 467, 401, 395.1, 370/252, 254, 241; 455/553.1, 426.1, 466, 455/454, 552.1, 554.1, 554.2, 555, 556.1, 455/557, 560
See application file for complete search history.

(56) References Cited

U.S. PATENT DOCUMENTS

| 6,853,851 B1 * | 2/2005 | Rautiola et al. ......... 455/553.1 |
| 6,871,063 B1 * | 3/2005 | Schiffer ...................... 455/410 |
| 6,888,808 B1 * | 5/2005 | Jagadeesan et al. ........ 370/328 |
| 2002/0085516 A1 * | 7/2002 | Bridgelall ................... 370/329 |
| 2004/0174880 A1 * | 9/2004 | White et al. ............. 370/395.3 |
| 2005/0025182 A1 * | 2/2005 | Nazari ......................... 370/469 |
| 2005/0147049 A1 * | 7/2005 | Ganesan ..................... 370/241 |

\* cited by examiner

*Primary Examiner*—Dang Ton
(74) *Attorney, Agent, or Firm*—David W. Carstens; Carstens & Cahoon, LLP

(57) ABSTRACT

The present invention provides a mobile unit (e.g., phone) for wireless communication that includes an antenna for detecting wireless fidelity (Wi-Fi) signals from a local area network and logic for switching the unit's operation from conventional cellular transmissions to Wi-Fi transmissions (i.e. 802.11) upon detection of Wi-Fi signals. The handheld device can communicate with a Public Switched Telephone Network (PSTN) using Voice Over Internet Protocol VOIP. In one embodiment, the logic for performing the switch to Wi-Fi transmission is programmed into a subscriber identity module (SIM) card in the device and can perform the switch automatically or in response to manual input after prompting the user. Memory and code in the mobile unit measure and store the duration of both cellular and Wi-Fi transmissions by the mobile unit.

12 Claims, 9 Drawing Sheets

USING A HANDHELD COMMUNICATION DEVICE WITH A HOT SPOT NETWORK

This application claims the priority of the commonly owned U.S. Provisional Application having Ser. No. 60/510,697 entitled USING A HANDHELD COOMMUNICATION DEVICE WITH A HOT SPOT NETWORK file on Oct. 10, 2003, which is hereby incorporated by reference.

TECHNICAL FIELD

The present invention relates generally to telecommunications and, more specifically to a method and system for wireless communications.

BACKGROUND OF THE INVENTION

Wireless service providers provide communications services between a mobile unit, e.g., wireless phone, Personal Data Assistant (PDA), computer, etc., and another user. Generally, the mobile unit communicates with a wireless network via a wireless communications protocol such as Code Division Multiple Access (CDMA), Time Division Multiple Access (TDMA), Global System for Mobile communications (GSM), General Packet Radio Service (GPRS), etc. The wireless network in turn provides connectivity to the telecommunications network, which typically comprises switches interconnected by cables or fiber and provides communications services to the other user.

As the proliferation of wireless services has expanded, so have the types of service offerings to reach different market segments. One of the fastest growing market segments is for prepaid wireless services. However, prepaid wireless services are often not cost effective for wireless service providers. Generally, when a prepaid wireless subscriber attempts to place or receive a telephone call, the network accesses a database to verify that the subscriber's account is current and has a remaining balance available for use. Many times, the access to the database is maintained for the duration of the call to update the subscriber's account in real time. This process is costly and may use resources that could otherwise be used to provide other services.

In addition to the proliferation of conventional cellular networks, Wireless Fidelity (Wi-Fi) networks (or "Hot Spots") are being installed by many major telephone carriers to provide added value to their basic retail business. Generally, hot spots are designed to attract customers into businesses (e.g., coffee shops, airports, bookstores, etc.) by means of the added value of enabling consumers to use their laptops or PDA's for Internet access while in these locations. However, current hot spot networks are largely limited to conventional Internet services and do not provide ready access to Voice Over Internet Protocol (VOIP) communication.

Furthermore, when a mobile unit switches to VOIP communication, it locks out conventional cellular transmissions, preventing wireless service providers from tracking the duration of VOIP calls by means of remote servers and updating the subscriber database as described above.

Therefore it would be desirable to provide mobile units than can utilize Voice Over Internet Protocol (VOIP) transmissions through a Wi-Fi network, as well as internally track the duration of such calls, allowing seamless time accounting for both conventional cellular and VOIP communication.

SUMMARY OF THE INVENTION

The present invention provides a mobile unit (e.g., phone) for wireless communication that includes an antenna for detecting wireless fidelity (Wi-Fi) signals from a local area network and logic for switching the unit's operation from conventional cellular transmissions to Wi-Fi transmissions (i.e. 802.11) upon detection of Wi-Fi signals. The handheld device can communicate with a Public Switched Telephone Network (PSTN) using Voice Over Internet Protocol VOIP. In one embodiment, the logic for performing the switch to Wi-Fi transmission is programmed into a subscriber identity module (SIM) card in the device and can perform the switch automatically or in response to manual input after prompting the user. Memory and code in the mobile unit measure and store the duration of both cellular and Wi-Fi transmissions by the mobile unit.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 1:
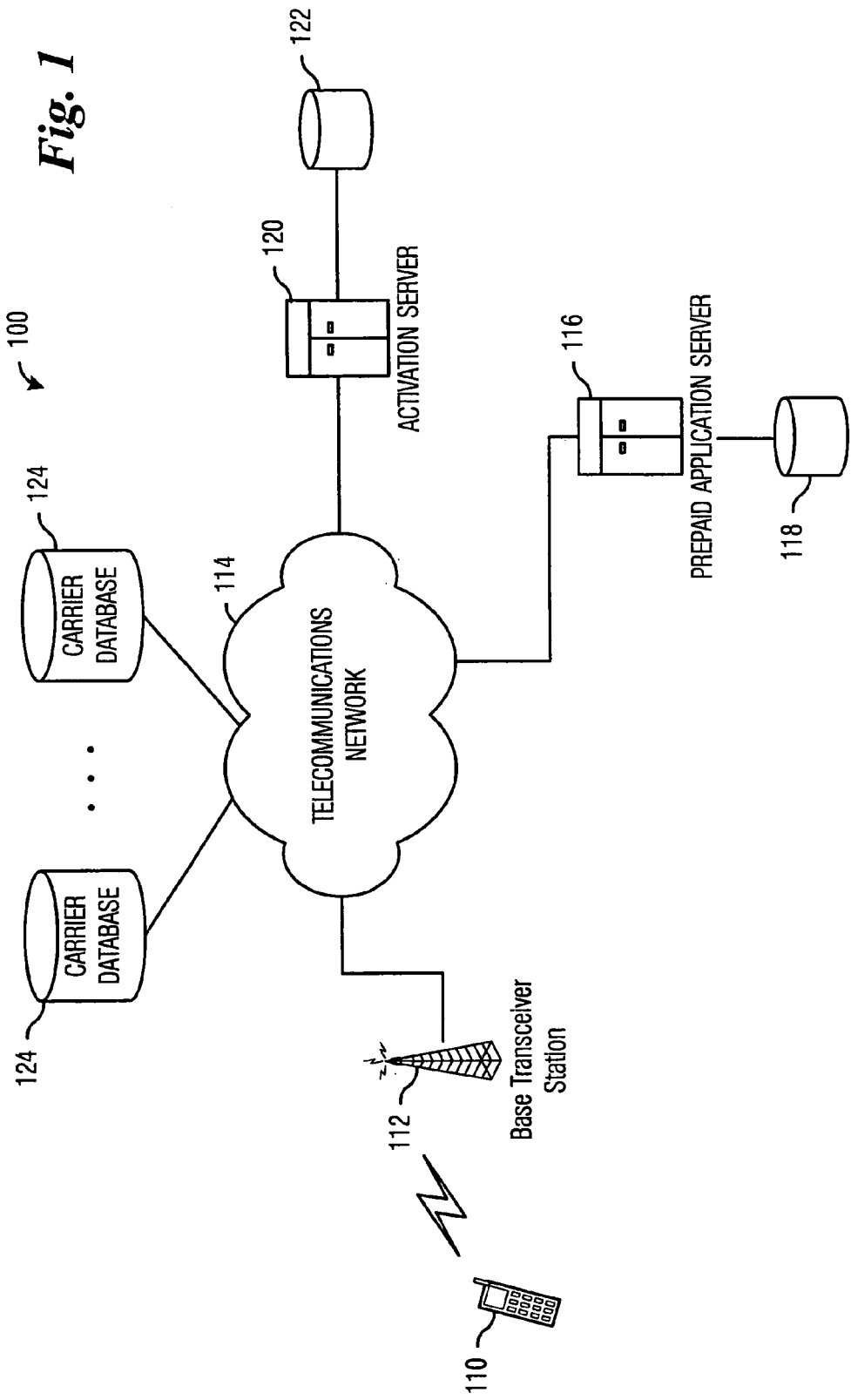
FIG. 1 depicts a telephony network in which the present invention may be implemented.

FIG. 1 depicts a telephony network in which the present invention may be implemented. It should be noted that those skilled in the art will recognize that the network 100 has been simplified to better illustrate features of the present invention. The network 100 comprises a mobile unit 110, a base transceiver station (BTS) 112, a telecommunications network 114, a prepaid application server 116, a prepaid application database 118, an activation server 120, an activation database 122, and one or more carrier databases 124.

The mobile unit 110 is configured to communicatively couple to the BTS 112, preferably via a wireless communications protocol such as GSM, CDMA, TDMA, GPRS, or the like. In addition, the mobile unit 110 is preferably configured to accept a subscriber identity module (SIM) card having a wireless prepaid application stored thereon (described in more detail below). The mobile unit 110 may be any suitable access device that may be configured to communication via a telecommunications network 114, such as a wireless phone, laptop computer, desktop computer, tablet personal computer, PDA, etc.

The BTS 112 is communicatively coupled to the telecommunications network 114, which may comprise wire and wireless network elements. The telecommunications network 114 may be, for example, a network such as the Internet, a local-area network (LAN), a wide-area network (WAN), a direct connection, a Public-Switched Telephone Network (PSTN), a wireless communications network, or the like.

The prepaid application server 116 provides registration and operational management functions for the wireless prepaid service and is communicatively coupled to a prepaid application database 118 that provides storage capabilities. It should be noted that the prepaid application server 116 is illustrated as a single component for illustrative purposes only and may comprise one or more servers and network elements. Furthermore, the prepaid application database 118 may be a stand-alone database system or integrated into the prepaid application server 116. The prepaid application database 118 may comprise an electronic storage medium such as a hard disk, tape storage, optical disks, memory, a storage area network (SAN), etc.

The activation server 120 and activation database 122 provide mobile unit activation/deactivation capabilities for the wireless prepaid application. Generally, a mobile unit 110 is identified by one or more unique identifiers. In one embodiment, the mobile unit 110 is identified by the combination of International Mobile Equipment Identifier (IMEI), a SIM card identifier, and a phone number. The activation server 120 and activation database 122 are maintained by a third party. One such third party is GEMPLUS, located in Dallas, Tex., which provides an activation/deactivation interface between the prepaid application server 116 and the carrier databases 124.

The carrier databases 124 represent the wireless service providers' databases of active mobile units (i.e. mobile unit 110). Generally, each wireless service provider (not shown) only allows mobile units that have been authorized or activation to place or receive telephone calls. Thus, the wireless prepaid application can control the ability of the mobile unit 110 to place or receive calls by modifying (or instructing the wireless service provider to modify) the status of the mobile unit 110 in the appropriate carrier database 124. Likewise, as discussed in more detail below, the ability of the mobile unit 110 to use different wireless service providers' networks may be controlled by modifying each wireless service provider's carrier database 124 independently.

Figure 2:
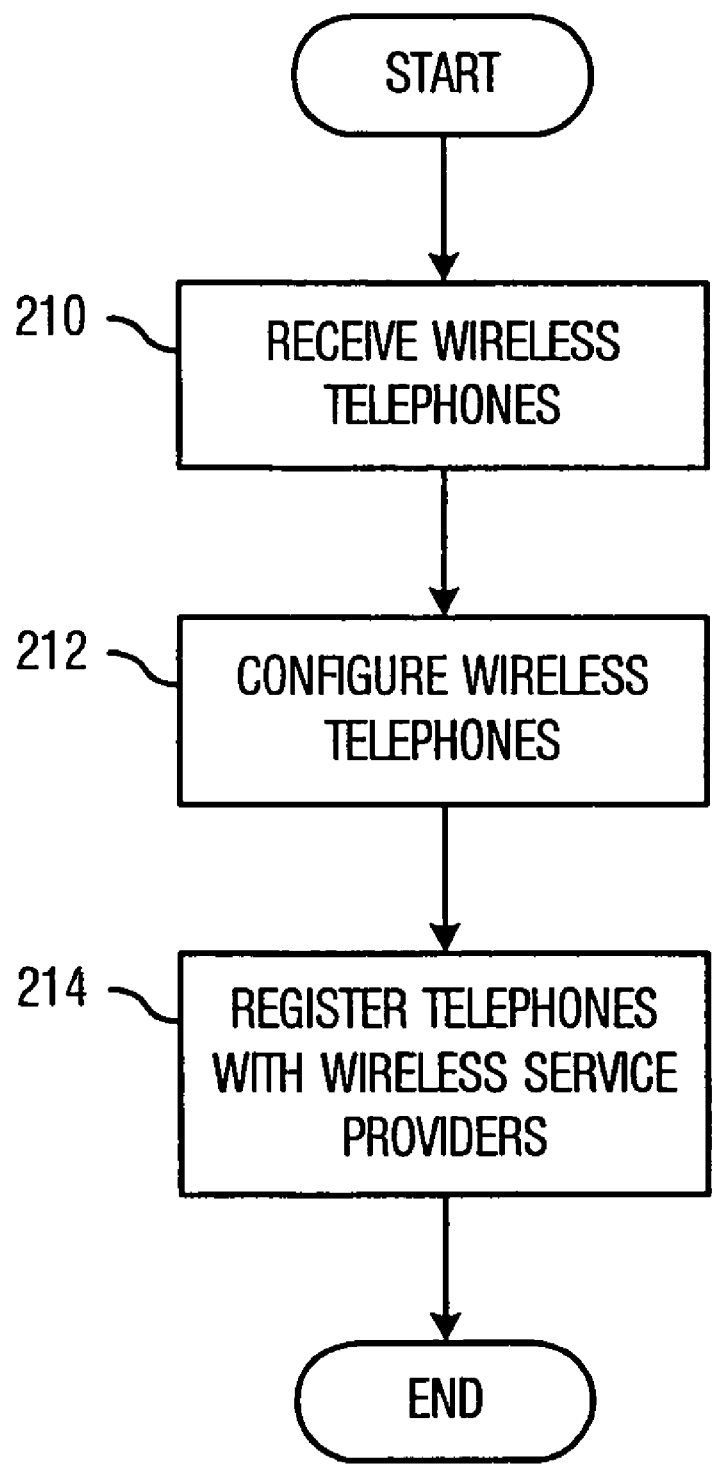
FIG. 2 is a flowchart of the steps used to configure a mobile unit in accordance with the present invention.

FIG. 2 is a flowchart of the steps used to configure a mobile unit in accordance with the present invention. The process begins when the mobile units are received from the manufacturer (step 210). Generally, manufacturers produce the mobile units and sell them in quantity to wholesalers. At this point, the mobile units are not configured for operation, and hence, must be properly configured prior to being used.

Each mobile unit is preferably identified by one or more unique identifiers. In one embodiment of the present invention, each mobile unit is uniquely identified by the IMIE and a telephone number. In the preferred embodiment in which the units are adapted for receiving a SIM card, each mobile unit is further identified by the SIM card number in combination with an IMIE and phone number (step 212).

The unique identifier (which may be a singular number or combination of numbers) is then registered with the carrier database (step 214). In one embodiment, the registration process includes registering the unique identifier with the prepaid application server and database. The registration of the unique identifier with the prepaid application server allows the wireless prepaid service to manage the minutes of the mobile units, detect fraudulent activities, and provide other customer services.

Furthermore, the registration process described above may utilize an activation service, which provides an interface between the wireless prepaid service provider and the wireless network service provider. In this embodiment, the prepaid application server may notify the activation server of the unique identifier and request that the corresponding mobile unit be authorized for use with one or more service providers. The activation server preferably stores the activation request information in the activation database and transmits a request to one or more carrier databases. Thereafter, the mobile unit is capable of placing and receiving wireless service.

It should be noted that the registration process describe above assumes that multiple companies must coordination their respective activities in order to provide the wireless prepaid services. For example, the mobile units are provided by a first company, the wireless services are provided by a second company, the wireless prepaid service is administered by a third company, and the activation interface is provided by a fourth company. Under different structures, the basic registration process described above may remain intact, but some steps and network elements may be combined. For example, the prepaid application server may communicate directly with the carrier database, thereby eliminating the need for the activation server.

Figure 3:
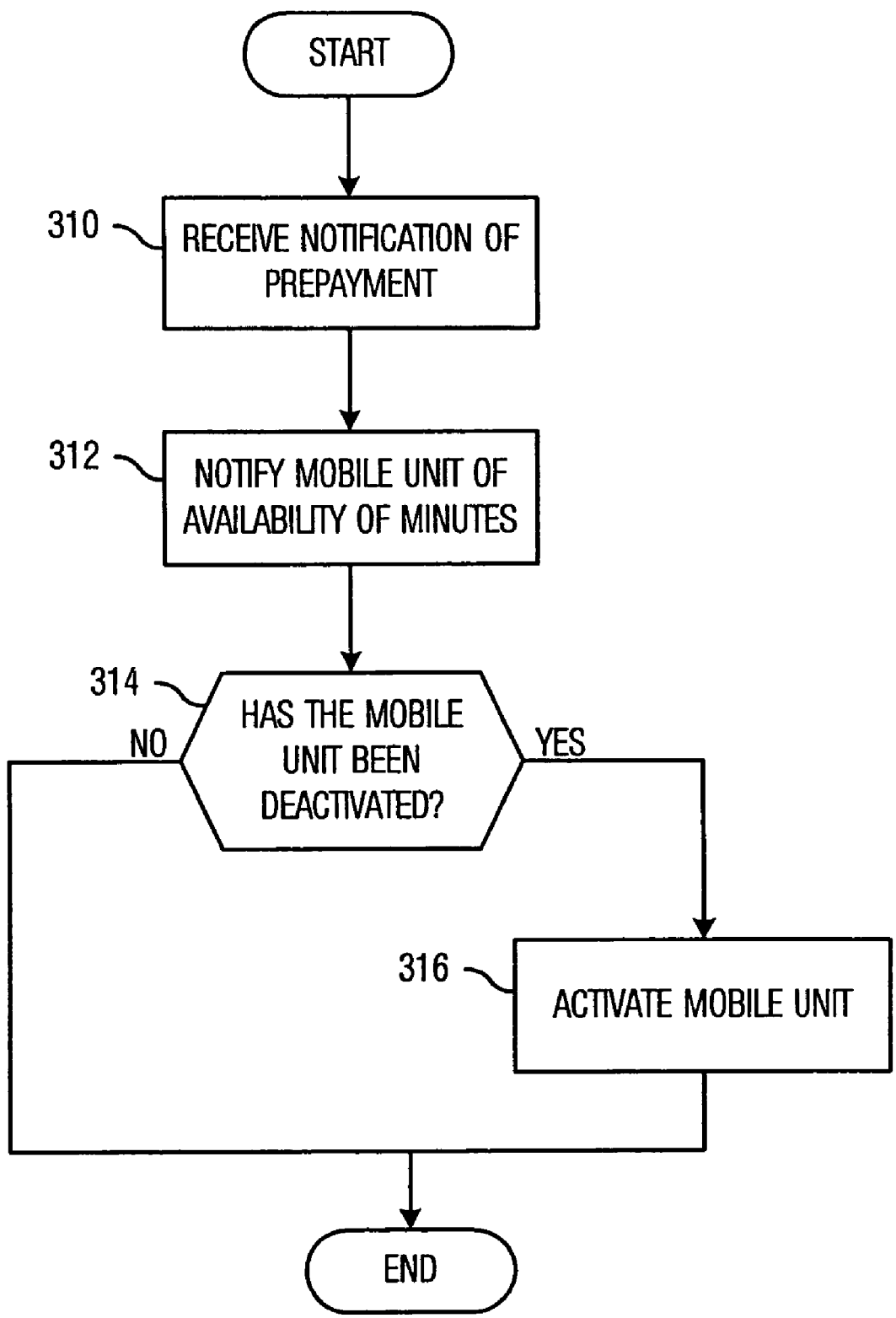
FIG. 3 is a flowchart illustrating the steps of activating or re-activating a mobile unit after prepayment of a service fee.

FIG. 3 is a flowchart illustrating the steps of activating or re-activating a mobile unit after prepayment of a service fee. The prepayment of a fee is preferably a specified amount for a specific amount of time units. The time units may be based upon any time period, e.g., seconds, minutes, hours. In one embodiment, a user prepays for a certain amount of time units. This is typically referred to as a flay rate plan, wherein the user pays for a number of minutes, regardless of when the use occurs.

The processing begins when notification of prepayment is received (step 310). The user may prepay via a variety of methods. For example, the user may prepay by sending a check to the service provider requesting that the check be applied to the user's account. The user may also contact the wireless service provider via phone or Internet connection and prepay using a credit or debit card. In a preferred embodiment of the present invention, the user is provided with one or more menus on the mobile unit itself, which allows the user to request the service provider to extract payment from the credit/debit card on file.

In one embodiment, the user may purchase the mobile unit from a vendor and dial a predetermined number, which is associated with a particular vendor, service special, or other marketing program. Once dialed, the user is connected to a customer service representative or automated system through which the user is able to prepay for services.

After the wireless prepaid service provider has received payment, the mobile unit is notified of the availability of time units (step 312). This may be accomplished with a short-message service (SMS) message from the prepaid application server to the mobile unit. In the preferred embodiment, the mobile unit itself tracks the number of time units available so as not to require the mobile unit to access the telecommunications network and application service during each use, thereby removing the need for additional ports and resources.

Next, the activation server determines whether or not the mobile unit in question has been deactivated (step 314). For example, a mobile unit may be deactivated when the prepaid time units have been completely used, when fraudulent activity has been detected, or other similar circumstances. If the mobile unit has been deactivated, the activation server enters the unit's unique identifier into the carrier database to be modified to reflect an active and authorized status (step 316).

If a determination is made that the mobile unit is already activated, the activation process ends.

In an alternate embodiment, a variable rate plan may be used in which the number of time units paid for may vary depending on the time of day. This may be accomplished by the mobile unit and/or the SIM card by tracking the dollar amount available and the cost of a call placed at difference time of the day.

Figure 4:
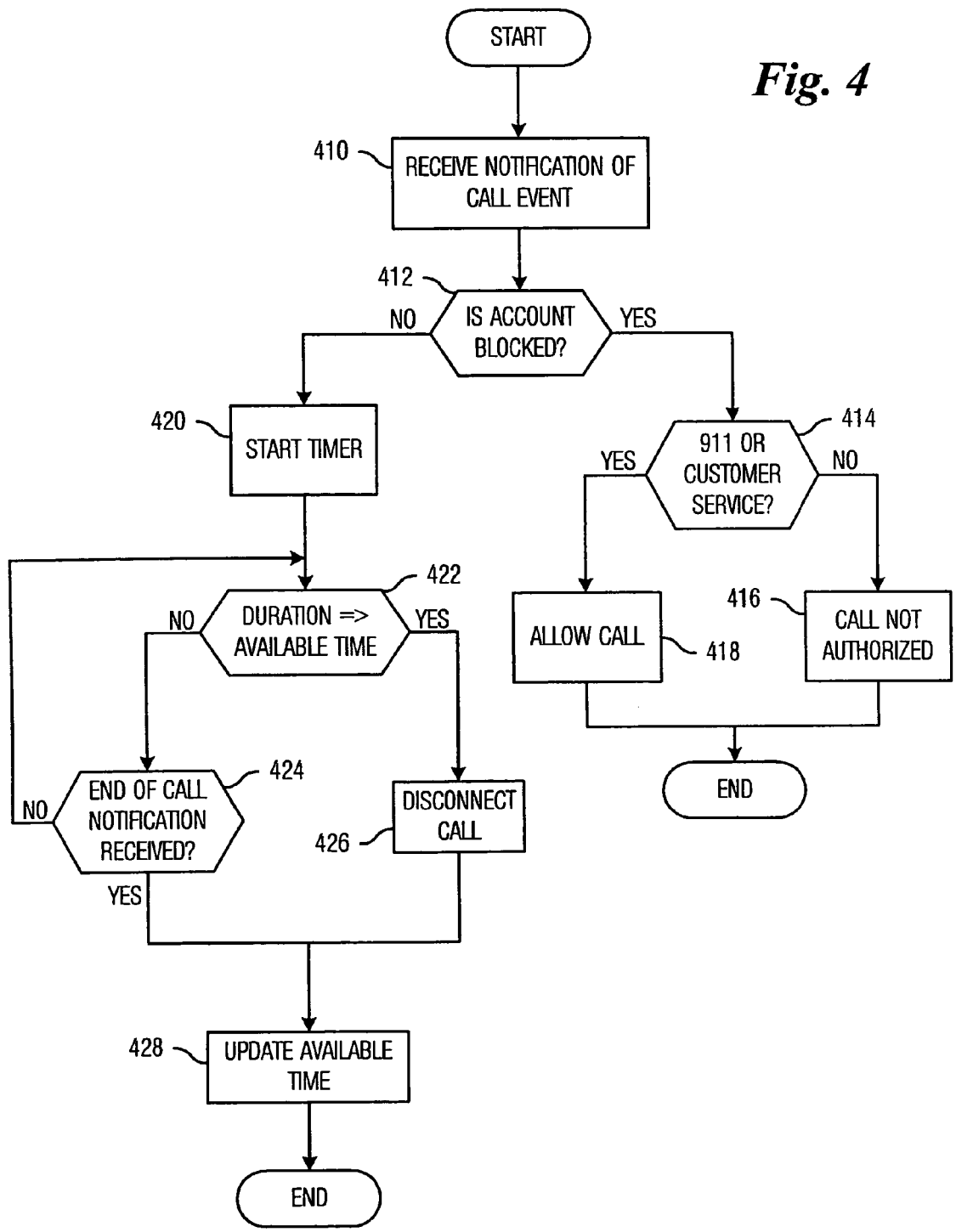
FIG. 4 is a flowchart illustrating the steps of a mobile unit utilizing wireless service in accordance with the present invention.

FIG. 4 is a flowchart illustrating the steps of a mobile unit utilizing wireless service in accordance with the present invention. The process begins when notification is received of a call event (step 410). The call event may be, for example, notification of an incoming call, placing an outgoing call, a command received from the user to dial a call or access a service via a wireless service provider (e.g., Web-based services), etc. upon receipt of the call event, a determination is made whether or not the account corresponding to the mobile unit is blocked or active (step 412). In typical situations, the account is blocked if no time units are available for use or if fraudulent activity has been detected in connection with the account. The account may also be blocked in other circumstances.

If the account is blocked, a determination is made whether the user is attempting to utilize the mobile unit for an exempt service (step 414). For example, in some situations, it is desirable, or required by law, that the mobile unit is allowed to perform certain activities such as placing a call to emergency services (i.e. 911). In addition, it might also be desirable to allow calls to customer service, thereby allowing the user to prepay for additional time units. These services are considered exempt regardless of the status of the user's account. Accordingly, if it is determined that the user is attempting to use an exempt service the call is allowed (step 418). If the attempted use is not for an exempt service, the call is not allowed (step 416).

Returning to step 412, if the account is not blocked, the timer of the mobile unit is started (step 420). The timer allows the mobile unit to monitor the usage of available time units. The mobile unit may be configured to deduct time units only for select call events. For example, some network configurations use a calling party pays (CPP) protocol, wherein the entity calling a mobile unit pays the wireless fees associated with the mobile unit.

After starting the timer, the process enters a loop in which the mobile unit continually determines whether the current duration of the call falls within the maximum available time units (step 422). If the call duration of the call reaches the maximum available time, the mobile unit disconnects the call (step 426). If time units are still available, the mobile unit checks for an end-of-call notification (step 424). Examples of end-of-call notifications include termination of the call by the user or remote party or a signal loss. If an end-of-call notification is not received, the mobile unit continues to monitor the duration of the call in step 422.

The available time units are updated by subtracting the duration of the call from the available time balance for the mobile unit (step 428).

In one embodiment of the present invention, the depletion of time units triggers text and/or audio warnings to the subscriber, similar to a low battery warning. The warnings may indicate when the remaining time units available and preferable are given at set intervals, e.g., 10 minutes remaining, 5 minutes, 1 minute, etc. if audio tones are used, the tones may be played such that only the user is able to hear the warning, not a remote party on the other end of a call.

Figure 5:
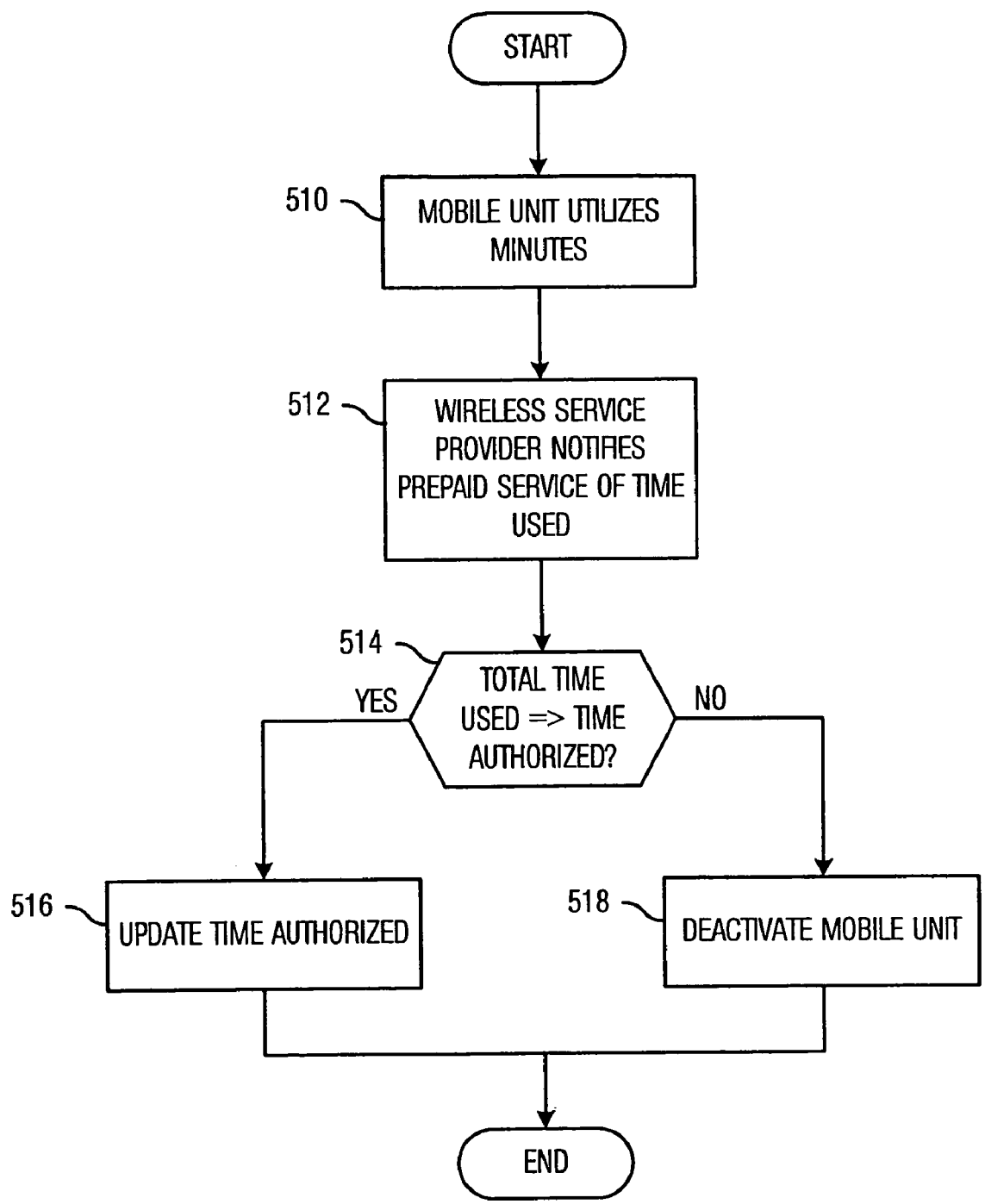
FIG. 5 is a flowchart depicting a method of remotely monitoring the wireless service activity of mobile units.

FIG. 5 is a flowchart depicting a method of remotely monitoring the wireless service activity of mobile units. The process begins when the mobile unit begins using time units (step 510). Upon call completion, the wireless service provider notifies the prepaid application server of the duration of the call (step 512). The notification may be by means of any suitable communications protocol such as Ethernet or IP message transmitted via the Internet. Furthermore, because the message is only sent once, after call completion, there is no need to maintain connections to the application prior to, during, or after the call.

The prepaid application server then determines whether the duration of the call is greater than or equal to the available prepaid time units (step 514). The prepaid application server maintains an account of time available for each mobile unit. If the number of time units used by the mobile unit during a call is less than the available time units, the prepaid application server updates the user account to reflect the amount of authorized time units remaining (step 516). If the duration of the call exhausts the available time units for that account, the mobile unit is deactivated by deactivating the entry for the mobile unit in the carrier database (step 518). By deactivating the carrier database entry for the mobile unit, the wireless service provider will not allow the mobile unit to utilize its services.

The embodiments described above thus maintain a time unit account on both the mobile unit and the prepaid application server. The mobile unit tracks the remaining available time units prior to and during a call. The prepaid application server, on the other hand, maintains an account of the remaining time units after the call is completed. This dual accounting approach allows the tracking of available time units to be handled primarily by the mobile unit, thus allowing the prepaid application server to be used for identifying fraudulent activity.

Figure 6:
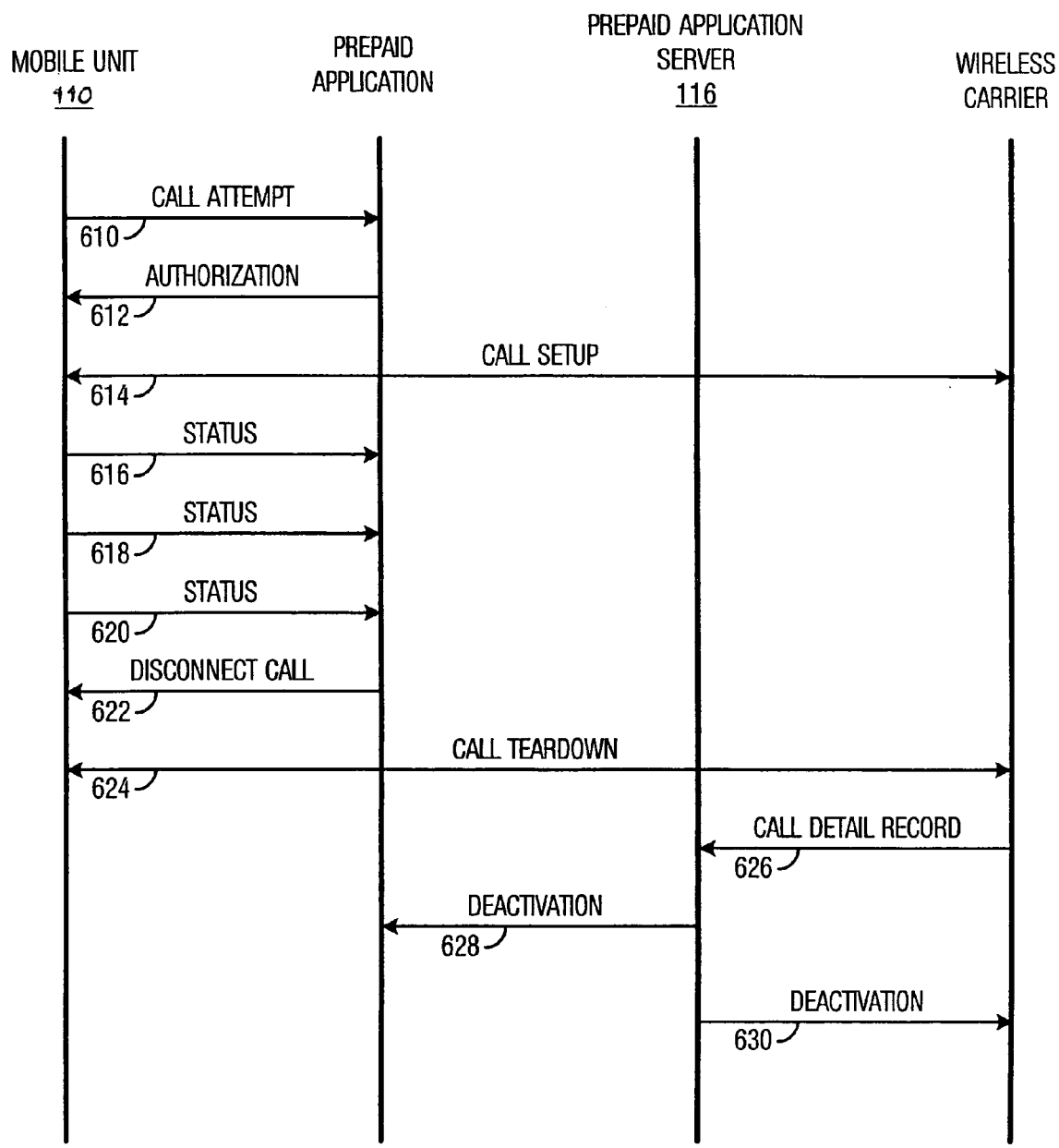
FIG. 6 depicts a process flow for the interaction of the components of a prepaid wireless service.

FIG. 6 depicts a process flow for the interaction of the components of a prepaid wireless service. The messages have been simplified for illustrative purposes. Accordingly, each message may be decomposed into more than one message.

Initially, the prepaid application receives a call attempt message 610 from the mobile unit 110. The prepaid application in the context of FIG. 6 is stored on the mobile unit 110 (or the SIM card). The prepaid application verifies that the mobile unit has authorized time units available and sends an authorization message 612 to the mobile unit 110.

Thereafter, the mobile unit 110 establishes the call 614 with the wireless carrier. During the call, the prepaid application on the mobile unit 110 monitors the duration of the call and verifies that the duration does not exceed the number of available time units, as indicated by messages 616–620.

Message 622 indicates that the prepaid application, in response to message 620, determined that the call duration reached the limit of authorized time, and therefore instructed the mobile unit 110 to disconnect the call. In response, the mobile unit 110 and wireless carrier exchange messages 624 to teardown the call.

Upon teardown of the call, the wireless carrier transmits a call detail record 626 to the prepaid application server 116. The call detail record contains, among other things, the duration of the call. The prepaid application server 116 deducts the duration of the call from the authorized time for the mobile unit 110. Upon detecting that the authorized time has fallen below a predetermined limit, the prepaid application server 116 sends deactivation message 628 to instruct the prepaid application to deactivate wireless services. The prepaid application server 116 also sends a message 630 to the wireless carrier to deactivate the mobile unit.

Figure 7:
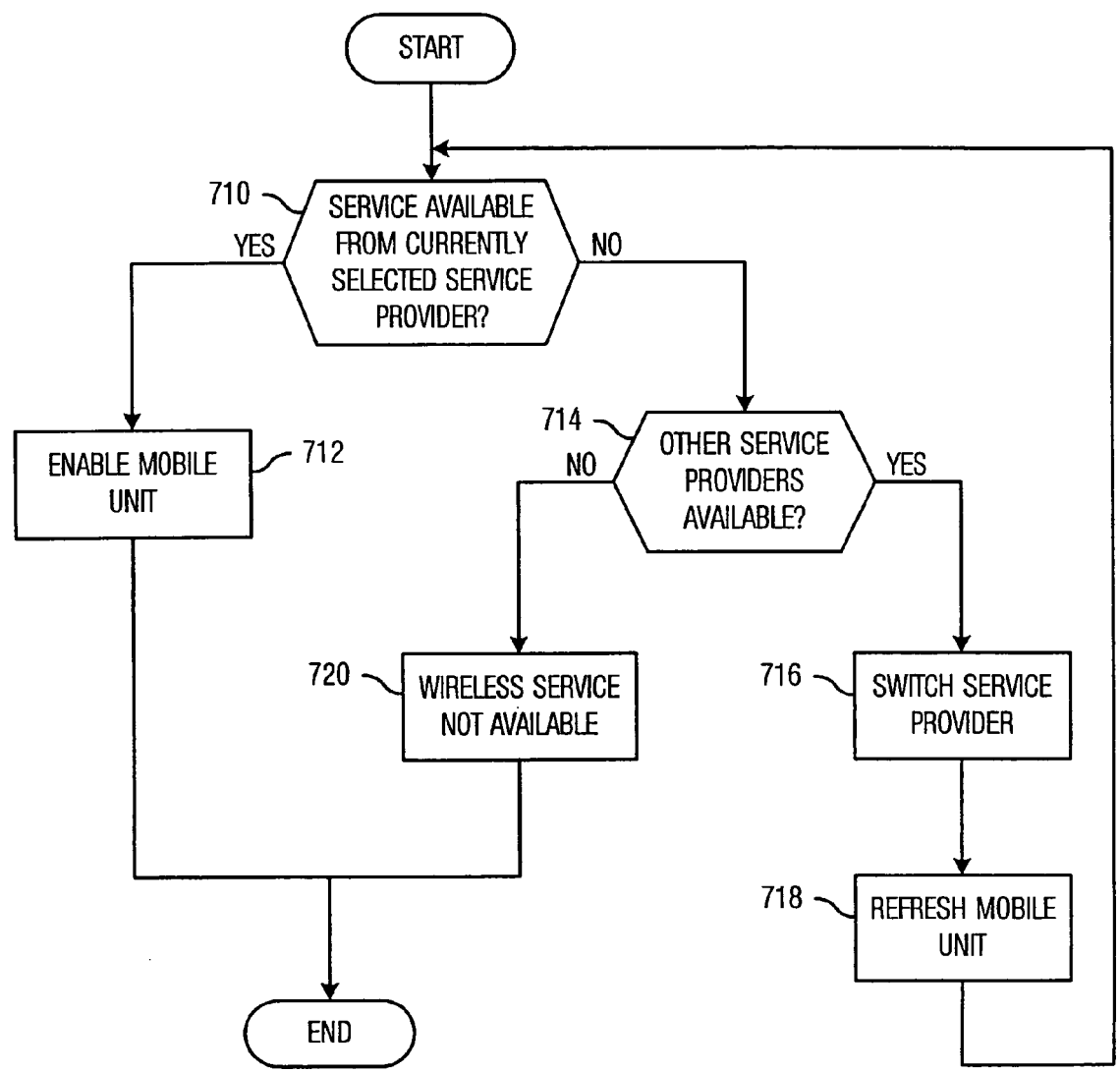
FIG. 7 is a flowchart illustrating the steps to switch wireless service providers for a mobile unit.

FIG. 7 is a flowchart illustrating the steps to switch wireless service providers for a mobile unit. The feature allows the user to prepay for a specific amount of time independent of the wireless service provider. The wireless prepaid service provider purchases time units from multiple wireless service providers having overlapping or complementary service areas. As the mobile unit moves from one area to another it may automatically switch wireless service providers.

The process begins when a determination is made whether service is available from the currently selected wireless service provider (step 710). The currently selected provider may be initialized to a default provider or may be initialized to the most recently used provider. In some situations, it may be desirable for the prepaid service provider to assign a default wireless provider based on promotional programs, to distribute minutes in proportion to those purchased from each wireless service provider, or other similar considerations.

If service is available from the currently selected service provider, the mobile unit is enabled to allow wireless service (step 712). However, if service is not available from the currently selected service provider, a determination is made whether or not other wireless service providers are available (step 714). If other service providers are not available, the user is notified that wireless service is not currently available (step 720).

If another service provider is indeed available, the service is switched to that provider (step 716). The mobile unit seeks the strongest signal. This approach works to the advantage of both end users are well as wireless service providers because signal strength is inversely proportional the number of users. Therefore, switching a mobile unit to the strongest available signal takes advantage of underutilized service capacity and prevents overload of already busy systems.

In the embodiment in which a SIM card is used, switching service providers may be performed by updating the contents of the International Mobile Subscriber Identity (IMSI) and Ki files of the SIM card. A REFRESH command may then be performed to load the new values into the mobile unit (step 718).

Wireless Fidelity (Wi-Fi) networks (or "Hot Spots") are being installed by many major telephone carriers to provide added value to their basic retail business. Generally, hot spots are designed to attract customers into businesses (e.g., coffee shops, airports, bookstores, etc.) by means of the added value of enabling consumers to use their laptops or PDA's for Internet access while in these locations.

The present invention expands the value added by hot spot networks by extending hot spot services to include telephonic communications in addition to the usual Internet services. Mobile units that have been modified to send and receive the 2.44 GHz network signals can utilize Voice Over Internet Protocol (VOIP) transmissions through an IEEE 802.+ network (current and future 802. type networks or equivalent) to communicate via the hot spot to the Internet and then to a PSTN.

When a mobile unit switches to VOIP communication, it locks out conventional cellular transmissions, preventing wireless service providers from tracking the duration of VOIP calls by means of remote servers. However, the prepaid mobile units provided by the present invention are able to account for this VOIP time, because the time tracking occurs within the mobile units themselves during the call.

When a user enters a hot spot, the mobile phone may automatically, or after prompting, switch from a cellular network to the hot spot wireless interface so as to function as an extension of the landline that is connected to the hot spot equipment. The user may then make outgoing calls via the hot spot network. The cell phone may also automatically, or in response to user command, switch back to the cellular network upon leaving the hot spot. The owner of the 802.+ network equipment may also decide whether to allow the user to connect. For example, users of a retail store hot spot network may be required to make a purchase in order to access the network.

Mobile phones can be configured to communicate with the Internet via the hot spot network by modifying the instructions of the SIM card or Removable User Identity Module (RUIM) to enable transmission and reception of 802.11+ radio signals. The handheld device may have a symbol displayed on a screen to indicate when the user is in a hot spot accessible area. The SIM card can then instruct the mobile phone to recognized the 802.11+ signals and disable the conventional cellular wireless frequencies.

Figure 8:
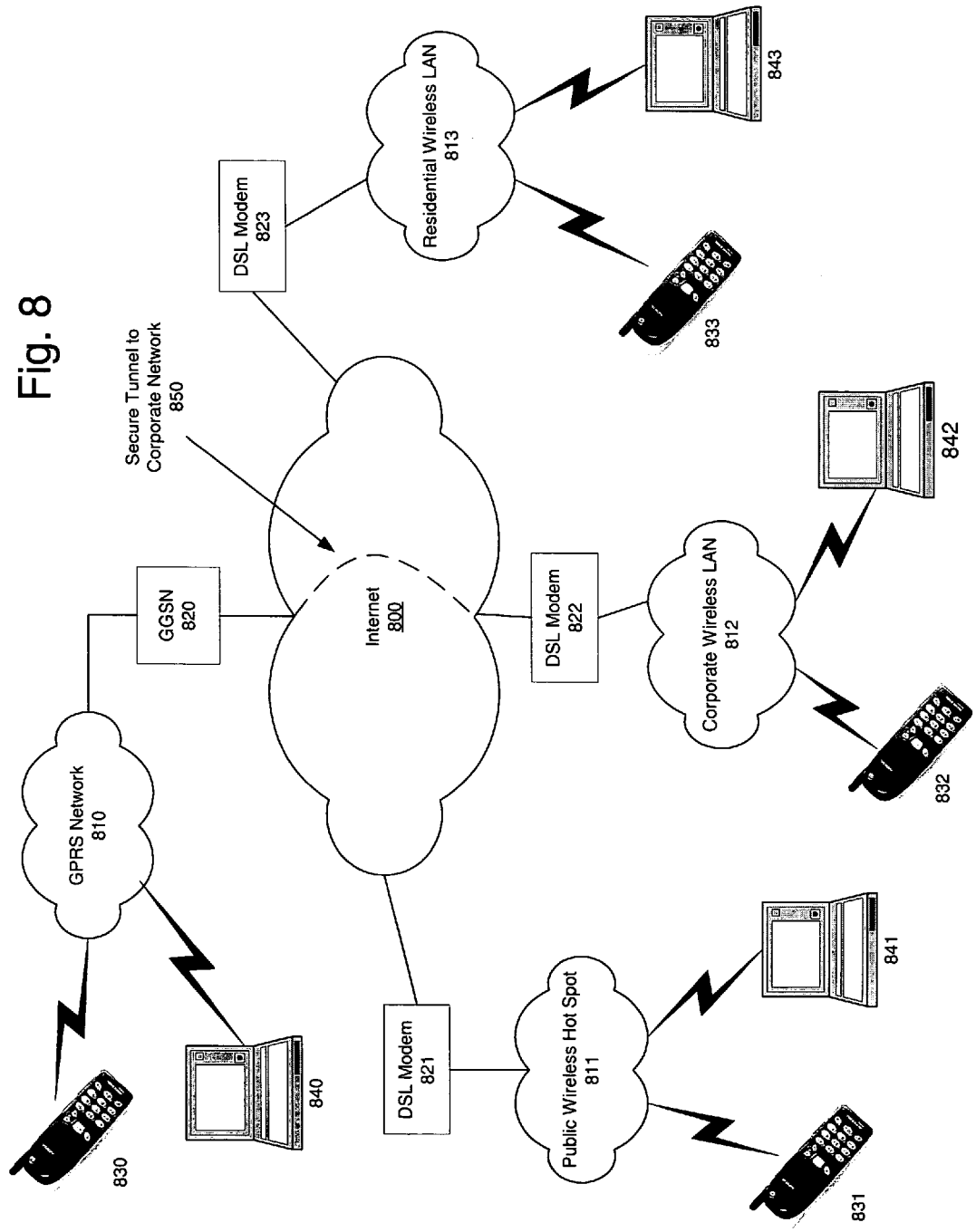
FIG. 8 shows a data and voice telecommunications network incorporating hot spot networks in accordance with the present invention.

FIG. 8 shows a data and voice telecommunications network incorporating hot spot networks in accordance with the present invention. In this example, users are able to communicate over the Internet 800 through various local networks 810–813. Users may connect through the local networks 810–813 for normal data transmission purposes using computing devices such as computers 840–843, as well as for telephonic transmissions using mobile phones 830–833.

The first local network is a General Packet Radio Service (GRPS) network 810 connected to the Internet 800 through a Gateway GPRS Support Node (GGSN) 820. The hot spot 811, corporate 812, and residential 813 wireless networks are standard local area networks connected to the Internet 800 through DSL modems 821–823, respectively. The primary difference between the three local networks 811–813 involves security and access by users.

Since the corporate 812 and residential 813 wireless LANs are reserved for private use, their access and use is restricted, with the corporate network 812 having the highest level of security. In the present example, the corporate LAN 812 also has a secure tunnel connection 850 with the GPRS network 810. For reasons explained above, the hot spot network 811 naturally has the most open access of the local networks depicted in FIG. 8.

It should be kept in mind that the present invention does not require modification to the local wireless networks 810–813. Rather, the modification is to the mobile phones 830–833, enabling them to transmit and receive using the 802.11+ standard.

Figure 9:
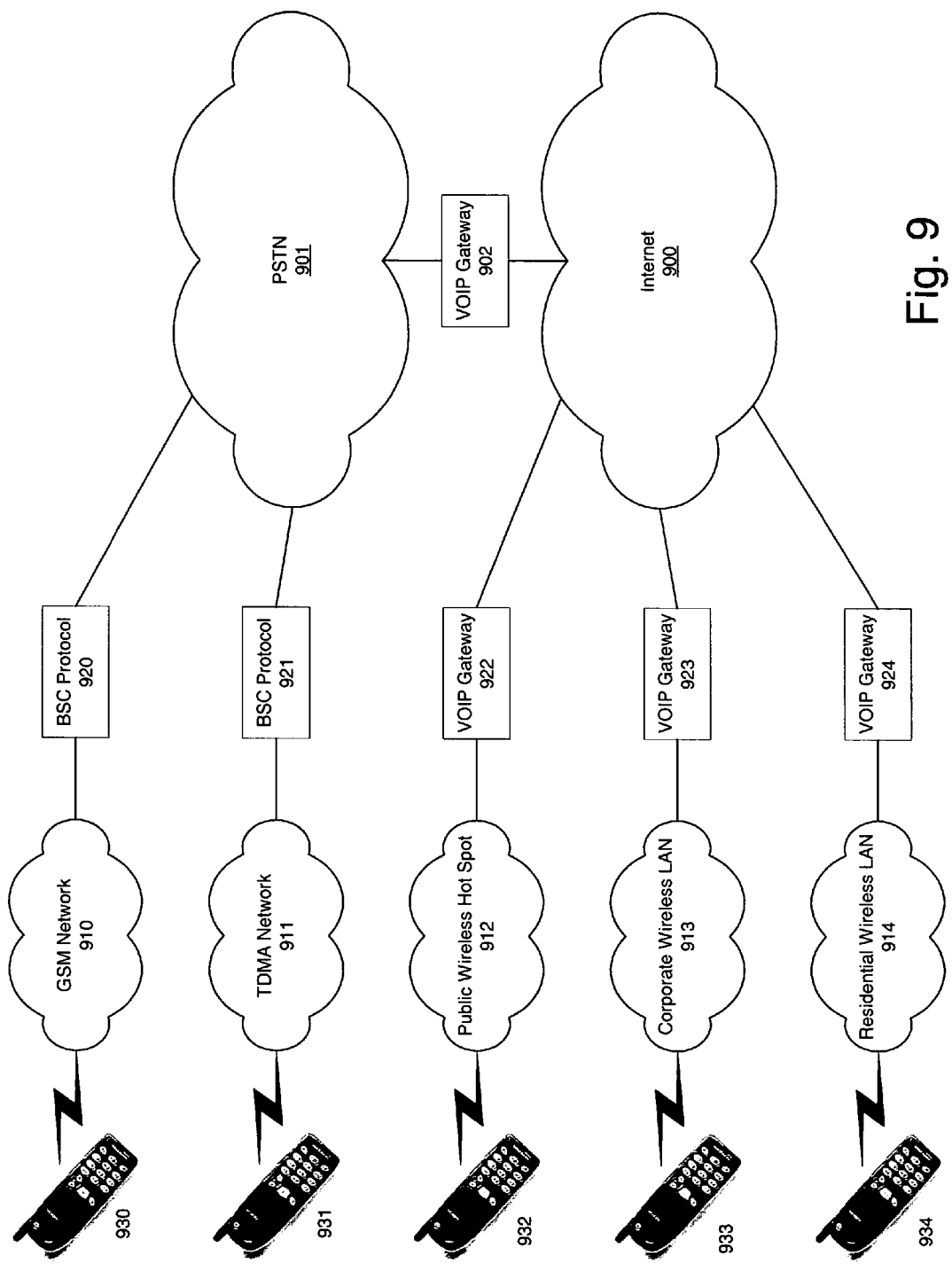
FIG. 9 shows a hot spot VOIP network connected with a Public-Switched Telephone Network (PSTN) in accordance with the present invention.

FIG. 9 shows a hot spot VOIP network connected with a Public-Switched Telephone Network (PSTN) in accordance with the present invention. In this example, the Internet 900 is connected to a standard PSTN 901 via VOIP gateway 902, allowing users of both Internet and PSTN services to communicate over both networks seamlessly.

The PSTN in the present example is directly connected to a GSM network 910 and a TDMA network 911 through Base Station Controller (BSC) Protocol connections 920, 921, respectively. Local wireless networks 921–914 are connected directly to the Internet 900 through VOIP gateways 922–924. As in FIG. 8, the local networks in FIG. 9 include hot spot 912, corporate 913, and residential 914 wireless networks, each with differing levels of security and access.

The mobile phones 930–934 have the ability to switch between conventional cellular signals and 802.11+ signals, either automatically or manually.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A mobile unit for wireless communication comprising:
   (a) transmission components and logic for conventional cellular communication;
   (b) an antenna for detecting wireless fidelity (Wi-Fi) signals from a local area network;
   (c) logic programmed into a subscriber identity module (SIM) card in the mobile unit for switching the mobile unit from conventional cellular transmissions to Wi-Fi transmissions upon detection of Wi-Fi signals, wherein the mobile unit communicates using Voice Over Internet Protocol (VOIP) when switched to the Wi-Fi transmissions; and
   (d) memory and computer program code for measuring and storing the duration of both conventional cellular and Wi-Fi transmissions by the mobile unit.

2. The mobile unit according to claim 1, wherein the mobile unit can communicate with a Public Switched Telephone Network (PSTN) using VOIP.

3. The mobile unit according to claim 1, wherein the Wi-Fi transmissions use the IEEE 802.11 standard.

4. The mobile unit according to claim 1, wherein the mobile unit switches to Wi-Fi transmission automatically upon detection of Wi-Fi signals.

5. The mobile unit according to claim 1, wherein the mobile unit switches to Wi-Fi transmission in response to manual input, wherein the mobile unit prompts a user when Wi-Fi signals are detected.

6. The mobile unit according to claim 1, wherein the mobile unit is a mobile telephone.

7. A method for communicating over the Internet using a mobile unit that is also capable of conventional wireless cellular communication, the method comprising:
   (a) detecting wireless fidelity (Wi-Fi) signals from a local area network using a signal seeking antenna on the mobile unit;
   (b) switching the mobile unit from conventional cellular transmissions to Wi-Fi transmissions upon detection of Wi-Fi signals, using logic programmed into a subscriber identity module (SIM) card in the mobile unit, wherein the mobile unit communicates using Voice Over Internet Protocol (VOIP) when switched to the Wi-Fi transmissions; and
   (c) using memory and computer program code in the mobile unit to measure and store the duration of both conventional cellular and Wi-Fi transmissions by the mobile unit.

8. The method according to claim 7, wherein the mobile unit can communicate with a Public Switched Telephone Network (PSTN) using VOIP.

9. The method according to claim 7, wherein the Wi-Fi transmissions use the IEEE 802.11 standard.

10. The method according to claim 7, wherein step (b) occurs automatically.

11. The method according to claim 7, wherein step (b) occurs in response to manual input, wherein the mobile unit prompts a user when Wi-Fi signals are detected.

12. The method according to claim 7, wherein the mobile unit is a mobile telephone.

* * * * *